United States Patent [19]

Tsutsumi et al.

[11] 3,927,278

[45] Dec. 16, 1975

[54] DIRECT-STATION-SELECTION INTERCOMMUNICATION AND AUTOMATIC HOLDING CIRCUIT IN A KEY TELEPHONE SYSTEM

[75] Inventors: Fumio Tsutsumi, Yokohama, Japan; Stephen Kerman, Merrick, N.Y.

[73] Assignees: Nippon Tsu Shin Kogyo K.K., Kanagawa, Japan; TIE/communications, Inc., Stamford, Conn.

[22] Filed: Mar. 23, 1973

[21] Appl. No.: 344,219

[52] U.S. Cl. .................................................. 179/99

[51] Int. Cl.[2] .......................................... H04M 1/00

[58] Field of Search ... 179/99, 18 BD, 18 AD, 81 R

[56] References Cited

UNITED STATES PATENTS

| | | | |
|---|---|---|---|
| 2,619,550 | 11/1952 | Humphries | 179/81 R |
| 3,419,684 | 12/1968 | Lord et al. | 179/99 |
| 3,571,520 | 3/1971 | Clarke, Jr. et al. | 179/42 |
| 3,598,924 | 8/1971 | Zucker | 179/99 |
| 3,760,122 | 9/1973 | Blomberg | 179/99 |
| 3,794,776 | 2/1974 | Goodman et al. | 179/99 |

FOREIGN PATENTS OR APPLICATIONS

| | | | |
|---|---|---|---|
| 1,174,848 | 7/1964 | Germany | 179/18 BD |

*Primary Examiner*—Thomas W. Brown
*Attorney, Agent, or Firm*—Kenyon & Kenyon

[57] ABSTRACT

Apparatus incorporated in an operator attended key telephone system for answering incoming calls to the key telephone system, placing such calls on hold, communicating with other key telephone sets in the system while the incoming call is held, and for transferring the incoming call to another key telephone set.

4 Claims, 2 Drawing Figures

DIRECT-STATION-SELECTION INTERCOMMUNICATION AND AUTOMATIC HOLDING CIRCUIT IN A KEY TELEPHONE SYSTEM

BACKGROUND OF THE INVENTION

The invention relates to key telephone systems, and apparatus incorporated in circuits for key telephone sets.

In conventional key telephone systems, functions such as outgoing calling, incoming call answering, holding and reanswering incoming calls, and intercommunication among key telephone sets in the system, are provided. In such systems, means are also provided for determining whether a key telephone set in the system is busy or idle.

Moreover, in conventional key telephone systems, circuit means are provided for transferring incoming calls from one key telephone set to another. However, several manual operations are required at the key telephone sets in such conventional systems to effect such transfer of incoming calls. These operations are generally complicated, and require trained personnel to perform them.

SUMMARY OF THE INVENTION

It is, therefore, an object of the invention to provide apparatus in a key telephone system for performing incoming call holding and transferring functions automatically.

It is a further object of the invention to provide such apparatus in circuits for key telephone sets, while simplifying the manual operations to be performed at such sets.

In accordance with one aspect of the invention, there is provided a circuit for a first key telephone set in a key telephone system, having a plurality of line keys for connecting the transmission network thereof to a like plurality of office line curcuits wherein the improvement comprises, in combination, a pair of intercom line conductors and at least one intercom station selection key associated with at least one other key telephone set having a transmission network. The combination further comprises means for holding an office line connected to said first key telephone set and for supplying a calling signal to the other key telephone set upon operation of the intercom station selection key, and also means, responsive to the operation of the intercom station selection key, for establishing a talking path between the transmission networks over the pair of intercom line conductors.

DETAILED DESCRIPTION OF THE PREFERRED EMBODIMENTS

Figure 1:
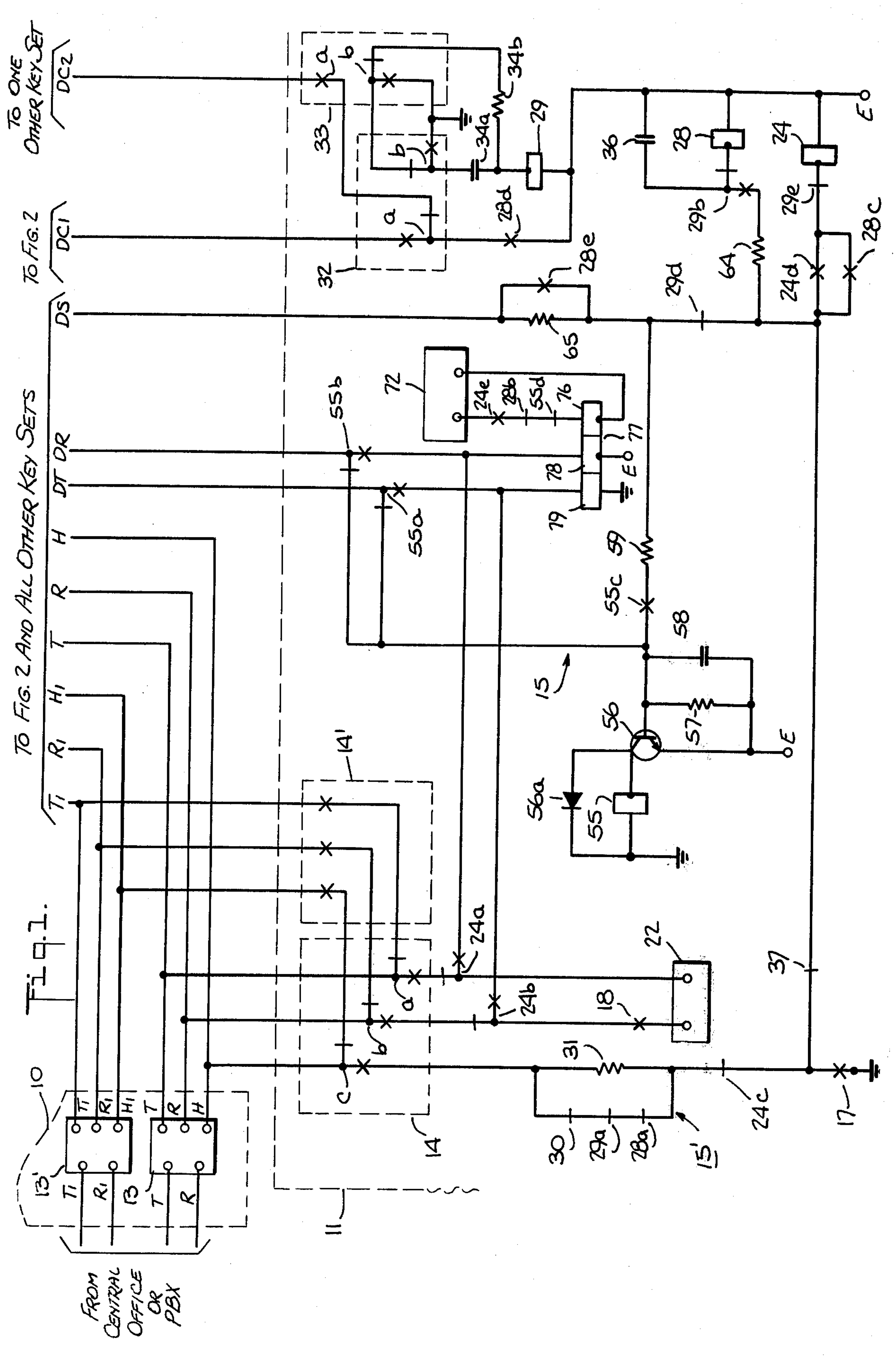
FIG. 1 is an electrical schematic and block diagram showing a portion of a key service unit, and one key telephone set connected thereto and incorporating apparatus constructed in accordance with the present invention.
Figure 2:
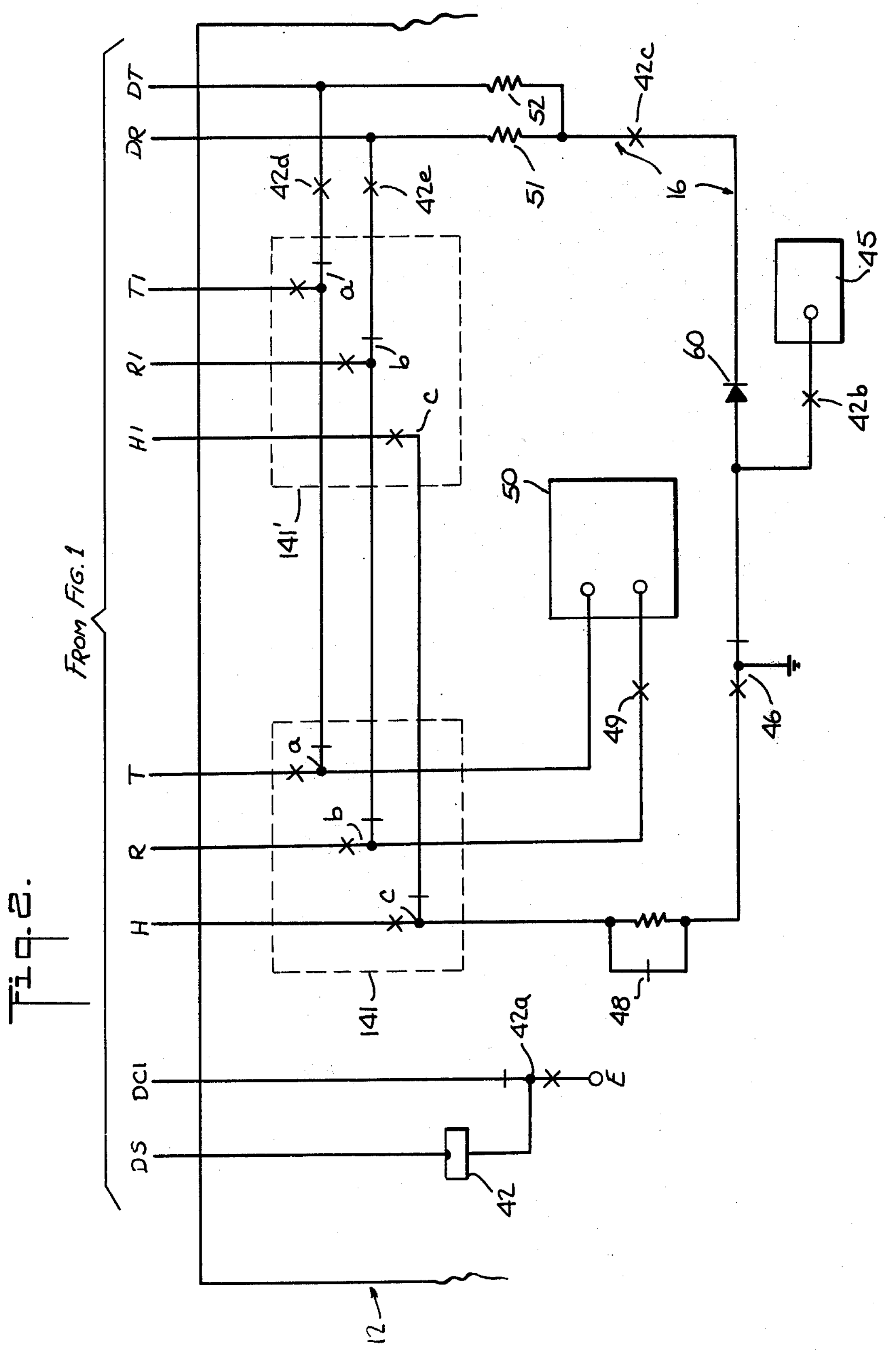
FIG. 2 is an electrical schematic and block diagram showing a typical key telephone set, which is to be connected to the apparatus of FIG. 1.

Referring to FIG. 1, a key telephone system constructed in accordance with the invention includes a key service unit 10 and an operator-attended key telephone set 11 electrically connected thereto. The system additionally includes a plurality of key telephone sets 12, only one of which is illustrated (FIG. 2).

In addition to the conventional apparatus incorporated in the key service unit 10, the unit also includes a plurality of line circuits 13 for connection to a corresponding plurality of central office or PBX lines. For convenience in explanation of the invention, only two such circuits 13, 13' and their incoming leads T, R and T1, R1 are shown in the drawings.

As is conventional, the T, R, H and T1, R1, H1 leads of circuits 13, 13' are connected to line keys 14, 14' and 141, 141' of telephone sets 11, 12 respectively, and as well to the corresponding line keys in the other key telephone sets incorporated in the system.

Although conventional line circuits 13, 13' may be incorporated in the key service unit 10, it is preferred to use the universal line circuit disclosed in patent application Ser. No. 341,209, filed on Mar. 14, 1973, now U.S. Pat. No. 3,865,995, by Stephen Kerman and Tsuyoshi Shinoi, entitled "Universal Subscriber's Line Circuit In a Key Telephone System."

In accordance with the present invention, it is contemplated that key telephone set 11 will be attended by an operator trained to answer incoming calls to the system and to route such calls to the appropriate one of key telephone sets 12. Accordingly, in addition to being equipped with a plurality of line keys 14, 14' and a conventional transmission network 22, the set 11 additionally includes an intercommunication or intercom control network means 15, and automatic call holding apparatus means 15'. In further accordance with the invention, the key telephone set 11 is additionally equipped with a plurality of intercom station selection keys 32, 33, each one of which is coupled by individual control leads DC1, DC2 to a different key telephone set 12. For convenience in explanation of the invention, only two such keys are shown in the drawings.

Each key telephone set 12 in the system is also equipped with a plurality of office line keys 141, 141', a conventional transmission network 50 and an intercom circuit means 16.

It is to be understood that, in the ensuing description of the invention, apparatus conventionally found in a key telephone system is not described in detail, since such apparatus and the operation thereof are well known to those of skill in the art. Moreover, it is to be noted that, where appropriate in the drawings, the apparatus illustrated has been shown in detached contact schematic form.

When an incoming call from a central office or PBX is connected over the T and R leads to a line circuit in the key service unit 10, for example, line circuit 13, and an appropriate indication of call arrival has been given at the key telephone sets 11, 12, the operator-attendant of set 11 lifts its handset (not shown) thereby closing hookswitch contacts 17, 18, and operates the appropriate line key 14, thereby connecting the universal line circuit's T and R leads via line key make contacts **14*a*, 14b, relay 24 break contacts 24*a*, 24*b* and hookswitch contact 18 to the transmission network 22. Moreover, ground is coupled to the line circuit's H lead via hookswitch make contact 17, break contacts 24*c*, 28*a* and 29*a* of relays 24, 28, 29, respectively, hold key break contact 30, and line key make contact 14*c*. This ground connection causes the line circuit 13** to assume its "talk" mode. At this time, the operator-attendant can talk to the calling party.

If the calling party wishes to speak to a party at one of the key telephone sets 12, the operator-attendant operates intercom station selection key 32 to initiate intercommunication with key telephone set 12, for example. Ground is thereby connected through make contact 32*b* of line key 32 through capacitor 34*a*, to a winding on a first relay means 29, thence to common power source E. The charging of capacitor 34a causes current to flow through the winding of relay 29 so that the first relay means 29 operates for a predetermined period of time, and then releases when capacitor 34a becomes charged. The opening of break contact 29*a* inserts resistor 31 in the H lead, thereby causing the line circuit 13 to assume its hold state, the value of resistor 31 having been chosen in accordance with the requirements of the line circuit for initiating the hold state. Also during the operation of relay means 29 contact 29b connects ground to the capacitor 36 through hookswitch make contact 17, break contact 37 of an intercom release key (not shown) and resistor 64. Capacitor 36 charges. The charging time of capacitor 36, and the amount of electrical energy stored therein are determined with reference to the duration of operation of first and second relay means 29, 28 to assure that, capacitor 36 charges fully while relay means 29 is operated and that when relay means 29 releases, relay means 28 is operated and held operated by the discharge from capacitor 36 for some desired period. The opening of contact 28*a* maintains the hold condition in line circuit 13 after the closing of contact 29*a*. While 28 is operated, the common power source E is connected via lead DC1 to the winding of relay means 42, incorporated in key telephone set 12, through its break contact 42*a*, from the circuit path including make contact 28*d* and line key make contact 32*a* to the lead DC1. Ground potential is connected to the other side of the winding of relay means 42 over the DS lead, via make contact 28*e*, break contacts 29*d* and 37 and make contact 17, operating relay means 42. When relay means 42 operates, the power source E is connected to its winding via make-before-break contact 42*a*, holding it operated.

Also, upon the operation of relay means 28, ground is connected to the winding of a third relay means 24 via break contacts 29*c*, and make contact 28*c*; third relay means 24 is thereupon operated and is locked up by the closure of make contact 24*d*. The transmission network 22 is thereby transferred at contacts 24*a* and 24*b* from the T and R conductors of the line circuit, which was previously placed into the hold state and maintains the office line connection, to the first and second windings of relay means 77 causing 77 to operate by current from power source E.

When capacitor 36 is discharged, relay means 28 releases, relay means 42 is then held by current flow through resistor 65. In addition, ground is coupled through hookswitch break contact 46 of set 12 through make contact 42*b* to buzzer 45, thereby giving an audible indication at that set of an incoming intercom call. It is to be understood that lamps for giving visual indications at set 12 of incoming intercom calls can also be employed.

At the same time, base current flows in transistor 56 of key telephone set 11, via the circuit path including hookswitch break contact 46 (FIG. 2), diode 60, make contact 42*c*, resistors 51, 52, leads DT and DR, and break contacts 55*a*, 55*b* of relay 55. Current then flows in the collector circuit of transistor 56, which is protected from reverse voltages by diode 56*a*, thereby operating relay 55. Closure of early make contact 55*c* holds transistor 56 on by connecting the base thereof to ground via break contacts 29d and 37, and make contact 17. Hence relay 55 remains operated.

At this time, a potential talking path between set 11 and set 12 has been established. One branch of this path extends from one terminal of transmission network 22 (FIG. 1) via make hookswitch contact 18, make contact 24*b*, make contact 55*a*, lead DT, make contact 42*d* (FIG. 2), break contact 141'*a* of line key 141', break contact 141a of line key 141, to one terminal of transmission network 50. The other branch of this path extends from the second terminal of transmission network 22 via make contact 24*a*, make contact 55*b*, lead DR, make contact 42*e* (FIG. 2), break contact 141'*b* of line key 141', break contact 141*b* of line key 141, to the make hookswitch contact 49. This talking path is completed when the party at telephone set 12 lifts its handset, thereby closing hookswitch make contact 49 and opening hookswitch break contact 46, cutting off the buzzer 45. It is to be noted that this talking path is established without the requirement of operating any line key at key telephone set 12.

If the incoming call from the central office of PBX, which is being held at line circuit 13, is to be transferred to key telephone set 12, the user of that set operates his line key 141, connecting the T, R and H leads of the universal line circuit 13 to make contacts a, b and c respectively of line key 141. Ground is connected via hookswitch make contact 46 and hold key break contact 48 to the H lead, resulting in release of the holding condition at circuit 13, as described in detail in the above-identified application, and the establishing of a talking path via the T and R leads between the incoming calling party and the transmission network 50 of key telephone set 12.

At this time, the operator of key telephone set 11 hangs up the handset, opening hookswitch contacts 17 and 18, the former releasing relay 24 in key telephone set 11 and relay 42 in key telephone set 12.

It should be noted that the user of key telephone set 12 can place the same call on hold by operation of its hold key to open break contact 48, thereby removing the direct ground from lead H.

In the event that key telephone set 12 is in use when the operator of key telephone set 11 is attempting to call the former via the intercom circuit, as described in detail above, relay 55 in key telephone set 11 does not operate, because the break contact 46 of the hookswitch in telephone set 12 is open. As a result, a busy tone signal from busy tone generator 72 is coupled via make conatct 24*e*, break contact 28*b* and break contact 55*d* to winding 76 of relay 77. This busy tone signal is induced into windings 78, 79 of relay 77 and coupled therefrom via make contacts 24*a*, 24*b* to the transmission network 22, thereby indicating to the operator of key telephone set 11 that key telephone set 12 is busy.

Moreover, if the user of key telephone set 11 wishes to communicate with another key telephone set, immediately after communication with key telephone set 12, intercom line key 33, for example, is operated, again placing ground on the circuit path through relay 29, which operates momentarily. As described above, after capacitor 34*a* charges fully, relay 29 releases. However, the operation of relay 29 opens its break contact 29*d*, removing ground from the base of transistor 56, and the winding of relay 42 in key telephone set 12. Relays 42 and 55 thereby release. In addition, break contact 29*c* also opens, removing ground from relay 24, which then releases. Accordingly, the intercom communication supervisory control circuit 15 is restored to its initial condition, preparatory to establishing an intercom connection to another key telephone set, and a connection is then subsequently established to the station corresponding to intercom key 33.

For convenience of explanation, the foregoing description of key telephone set 11 has been made with reference to only two office line keys 14, 14' therein. It is to be appreciated by those of skill in art, that a plurality of such line keys are incorporated in a typical key telephone set, each connecting to a different office line circuit such as 13, 13'. Moreover, it is to be appreciated by those of skill in the art that, although only two intercom circuits and keys 32, 33 have been shown for convenience of explanation, key telephone set 11 can be equipped with as many intercom keys as there are key telephone sets 12 in the system.

While specific embodiments of the invention have been disclosed, variations in procedural and structural detail within the scope of the appended claims are possible, and are contemplated. There is, therefore, no intention of limitation to the abstract, or the exact disclosure herein presented.

What is claimed is:

1. A circuit for a first key telephone set in a key telephone system having a plurality of line keys for connecting the transmission network thereof to a like plurality of office line circuits wherein the improvement comprises, in combination, a pair of intercom line conductors;

at least one intercom station selection key associated with at least one other key telephone set having a transmission network;

means, including first and second normally released relays, for holding an office line connected to said first key telephone set and for supplying a calling signal to said other key telephone set upon operation of said intercom key;

means, responsive to said operation of said key, including normally released third and fourth relays, for establishing a talking path between said transmission networks over said pair of intercom line conductors, said third relay operating in response to the release after operation of said second relay, and said fourth relay operating in response to a switch hook status indication from said other key telephone set;

first capacitor means connected in series with an operating winding of said first relay;

second capacitor means, including a make contact of said first relay, for storing electrical energy during the period of operation of said first relay; and means, including a break contact of said first relay, for supplying said electrical energy to an operating winding of said second relay;

the enumerated means being so proportioned and the combination being so constructed and arranged that said first relay operates for a period of time determined primarily by said first capacitor, and said second relay operates for a period of time determined primarily by said second capacitor.

2. The key telephone set circuit according to claim 1 further including normally non-conducting transistor circuit switch means connected in series with an operating winding of said fourth relay, said switch means being biased to a conducting state by a switch hook status indication from said other key telephone set.

3. The key telephone set circuit according to claim 1 further including a second intercom station selection key, associated with a second other key telephone set, and wherein said office line holding and calling signal supplying means is operative in response to the operation of either of said intercom line keys.

4. The key telephone set circuit according to claim 2 further including a second intercom station selection key, associated with a second other key telephone set, and wherein said office line holding and calling signal supplying means is operative in response to the operation of either of said intercom line keys.

* * * * *